(12) United States Patent
Gravelle et al.

(10) Patent No.: US 7,347,368 B1
(45) Date of Patent: Mar. 25, 2008

(54) METHOD OF ENROLLING IN AN ELECTRONIC TOLL OR PAYMENT COLLECTION SYSTEM

(75) Inventors: Kelly Gravelle, San Diego, CA (US); Frances E. Lindsay, Jr., Tennessee Colony, TX (US)

(73) Assignee: TC License Ltd., Hummelstown, PA (US)

( * ) Notice: Subject to any disclaimer, the term of this patent is extended or adjusted under 35 U.S.C. 154(b) by 266 days.

(21) Appl. No.: 11/136,437

(22) Filed: May 25, 2005
(Under 37 CFR 1.47)

Related U.S. Application Data (63) Continuation-in-part of application No. 10/698,943, filed on Nov. 3, 2003.

(60) Provisional application No. 60/486,190, filed on Jul. 11, 2003.

(51) Int. Cl.
G07B 15/02 (2006.01)

(52) U.S. Cl. .................. 235/384; 235/383; 235/380; 235/382; 705/13

(58) Field of Classification Search ............ 235/384, 235/380, 381, 382, 383, 449, 451; 705/13
See application file for complete search history.

(56) References Cited

U.S. PATENT DOCUMENTS

| | | | |
|---|---|---|---|
| 5,287,112 A | | 2/1994 | Schuermann |
| 5,374,930 A | | 12/1994 | Schuermann |
| 5,424,727 A | | 6/1995 | Shieh |
| 5,450,359 A | | 9/1995 | Sharma et al. |
| 5,809,480 A | | 9/1998 | Chasek |
| 5,819,234 A | * | 10/1998 | Slavin et al. .............. 340/10.4 |
| 5,955,970 A | | 9/1999 | Ando et al. |
| 6,058,372 A | * | 5/2000 | Sweet et al. .................. 705/16 |
| 6,422,464 B1 | * | 7/2002 | Terranova ................... 235/384 |
| 6,559,866 B2 | * | 5/2003 | Kolde et al. ................ 715/765 |
| 7,213,755 B2 | * | 5/2007 | Newsome et al. ......... 235/384 |
| 2004/0016801 A1 | * | 1/2004 | Newsome et al. ......... 235/382 |
| 2004/0138924 A1 | * | 7/2004 | Pristine ......................... 705/2 |

* cited by examiner

*Primary Examiner*—Steven S. Paik
(74) *Attorney, Agent, or Firm*—Caesar, Rivise, Bernstein, Cohen & Pokotilow, Ltd.

(57) ABSTRACT

A method of enrolling in an electronic toll or payment collection system including the steps of providing a kiosk that has a programmed computer with an interactive program for enrolling a user in the electronic toll or payment collection system including a user interface and inputting the user's information into the programmed computer through the user interface. The method also includes the step of dispensing a transponder for the electronic toll or payment collection system from the kiosk, the transponder being associated with the user based on the user's information inputted into the programmed computer.

25 Claims, 4 Drawing Sheets

METHOD OF ENROLLING IN AN ELECTRONIC TOLL OR PAYMENT COLLECTION SYSTEM

REFERENCE TO RELATED APPLICATIONS

The present application is a continuation-in-part of copending application Ser. No. 10/698,943 entitled Self-Service Electronic Toll Collection Unit and System, filed Nov. 3, 2003, which claims the benefit of U.S. Provisional Application No. 60/486,190, filed Jul. 11, 2003, the disclosure of each of which is hereby incorporated by reference in its entirety into the present application.

FIELD OF THE INVENTION

The present invention relates to enrolling a user in an electronic toll or payment collection system and automatically dispensing a transponder associated with the system to the user.

BACKGROUND OF THE INVENTION

Tolls on turnpikes, bridges, and other toll facilities are increasingly collected through the use of electronic toll collection devices. The use of such devices to pay tolls is both faster and more convenient than paying in cash or tokens.

Such a device typically takes the form of a transponder that is attached to the inside of the windshield of a vehicle. The transponder stores a number identifying a user's account. At a suitably equipped tool booth, the transponder is read to determine the account number, and the user's account is debited by the amount due for the toll. The user must from time to time add money to the account. An example of such a toll or payment collection system is E-ZPass™, used in states from Massachusetts to West Virginia. Examples of conventional electronic toll or payment collection systems include U.S. Pat. Nos. 5,955,970 to Ando et al., 5,809,480 to Chasek, 5,450,359 to Sharma et al., 5,424,727 to Shieh, 5,374,930 to Schuermann, and 5,287,112 to Schuermann, the subject matter of each of which is hereby incorporated by reference.

In the state of the art, large customer-service centers are staffed to open and maintain accounts, manage transponder inventories and distribution, and provide responses to customer complaints. To obtain a transponder, a potential user must either visit one of a limited number of such customer-service centers, which may be in an inconvenient or even unsafe location and may have limited hours of operation, or order a transponder through the mail or over the Internet and then wait for it to arrive. Even users who already have transponders often have to visit customer-service centers to replenish or otherwise manage their accounts. In addition to the inconvenience to the user, such an arrangement imposes a cost on the toll authority, which must hire enough staff to serve all potential customers.

Furthermore, current operations are not convenient for cash-paying customers. Many potential users must pay cash because they do not have credit cards or even bank accounts. Others desire the anonymity and privacy provided by cash. As a result, toll authorities are limited in their ability to move to electronic toll or payment collection, as they cannot readily accommodate users paying in cash.

Another issue is the desire to implement "open road tolling systems," which are systems that collect tolls only automatically, without manual intervention. Toll agencies need to collect tolls from frequent users, but also desire to provide access to occasional and transitional users such as tourists or seasonal residents. The cost, time and inconvenience associated traditional tag distribution and account set up typically mean that agencies need to maintain a large number of lanes for cash collection of individual transactions to accomplish this. Alternatively, some roads in recent years (for example, Highway 407 in Toronto) have moved to all-electronic collection that uses a combination of RF tags and "pay by plate." In "pay by plate" the agency deploys a system to capture the license plate image in lieu of the transponder. It then accesses the DMV database to obtain the vehicle owner's information and bills the vehicle owner for the transaction. This typically requires special legislation and is very expensive process to administer, driving up the cost of toll or payment collection. Further, video capture and license plate reading (combining automated and manual processes) is inherently less accurate than the RF ID based tag systems, resulting in potential lost revenue to the toll authority.

SUMMARY OF THE INVENTION

In light of the above, it will be apparent that a need exists in the art to provide convenient, automated sales of transponders and maintenance of accounts. It is therefore an object of the invention to provide an automated, self-service unit for dispensing toll or payment collection devices.

It is another object of the invention to provide such a unit for permitting users of existing toll or payment collection devices to manage their accounts.

It is still another object of the invention to provide such a unit which accepts payment in one or more forms, one of which may be cash.

It is yet another object of the invention to provide such a unit which can be used to implement an open road tolling system.

To achieve the above and other objects, the present invention is directed to a unit that allows for account management, maintenance, and fulfillment for mobile payment systems such as Electronic Toll Collection. The essence of the invention is a self-service unit that accepts credit cards, debit cards, and cash as payment means to open or replenish an account. The preferred embodiment consists of a unit with a slot for a magnetic stripe card reader, a cash acceptor, a receipt printer, a display, and a transponder dispenser. An interface to a transponder reader is also provided, or possibly to an integrated transponder reader. Preferably, the transponders are in a thin form with a self-adhesive (a sticker format) and are dispensed using technology similar to ticket dispensers as commonly used on toll turnpikes and in parking garages. A processing unit interfaces to all of these devices. In the preferred embodiment, the processing unit consists of a single board computer and power supply with a TCP/IP interface (the "brick"). The brick is an internet appliance, designed to interface over a TCP/IP network to any computer using a standard browser supporting HTML pages. Ideally the brick interfaces to all peripherals described above via the TCP/IP network, however some devices may require dedicated interfaces, such as an RS-232 serial interface. An interface is provided to a Customer Service Facility where the different types of accounts are maintained. The system can employ a dedicated TCP/IP network for communication between the Customer Service Facility and the unit; however, an important alternative is to use an existing banking network for this communication. This can provide the advantage that some subset of the functions of the unit can be performed using existing infrastructure (card swipe machines, validation terminals etc) already present on the network. The processing unit performs the following functions:

1. Accept Cash for anonymous and non-anonymous accounts. Receipts are printed for all cash deposits.

Four options:

a) Open an anonymous account. In this case the system opens a numbered account that is associated with the transponder number. To set up the account, a minimum dollar amount is required which typically provides sufficient funds for multiple tolls. No balance is associated with the account until cash is deposited, and higher amounts than the minimum may be initially applied. This can be done roadside, in-lane, or drive-up or walk-up. If an existing banking network is used, this can be accomplished using equipment that is already commonly available at retail merchant facilities. This can greatly enhance the reach on the overall system to account replenishment and distribution by leveraging existing infrastructure b) Read a magnetic stripe card issued in association with an existing account and top up that account. The cash accepted then goes to top up the associated account. This can be done roadside, in-lane, or drive-up or walk-up. If an existing banking network is used, this can be accomplished using equipment that is already commonly available at retail merchant facilities. This can greatly enhance the reach on the overall system to account replenishment by leveraging existing infrastructure. However, typically this may not be preferred for in-lane operation due to a desire to reduce transaction times.

c) Accept manual (keypad) entry of tag number with cash payment, which is then associated with the account corresponding to the tag. This can be done roadside, in-lane, or drive-up or walkup.

However, typically this may not be preferred for in-lane operation due to a desire to reduce transaction times.

d) Read a tag in the lane and associate the cash payment with the account corresponding to the tag in the lane. This allows an anonymous cash based user to "pay once, use many" in the most efficient way possible. That is the preferable approach if in-lane payments are to be used due to speed of the transaction.

2. Accept Credit Cards (CC) and Debit Cards (DC)

Two options:

a) Single time use—similar options as cash i) Open an account without auto-replenish. In this case the system opens a numbered account that is associated with the transponder number. To set up the account, a minimum dollar amount is required drawn upon the credit card or debit card in a onetime transaction with real time authorization that typically provides sufficient finds for multiple tolls. No balance is associated with the account until the card transaction is complete, and higher amounts than the minimum may be initially applied. This can be done roadside, in-lane, or drive-up or walk-up. Even though the account is not auto-replenished, the card used to open the account is retained such that the user can modify the account to auto-replenish at any time at a kiosk or on the web (or even by phone to a CSR or via voice response system if this option was desired).

ii) Read a magnetic stripe card issued in association with an existing account, then read a second magnetic stripe credit card or debit card and top up the account. Alternatively, recognize the account from the credit card or debit card number and top up the associated account. If a credit card or debit card is used to top up an account that is not auto-replenish, offer to convert the account to auto-replenish. If the offer is refused, retain the credit card or debit card information so that it can be converted at a future date to auto replenish either at a kiosk or via the web. This can be done roadside, in-lane, or drive-up or walk-up. However, typically this may not be preferred for in-lane operation due to a desire to reduce transaction times.

iii) Accept manual (keypad) entry of the tag number with the debit card or credit card payment, which is then associated with the account corresponding to the tag. If a card is used to top up an account that is not auto-replenish, an offer is made to convert the account to auto-replenish. If the offer is refused, the card information is retained so that it can be converted at a future date to auto replenish either at a kiosk or via the web. This can be done roadside, in-lane, or drive-up or walk-up. However, typically this may not be preferred for in-lane operation due to a desire to reduce transaction times.

iv) Read a tag in the lane and associate the card payment with the account corresponding to the tag in the lane. If a credit or debit card is used to top up an account that is not auto-replenish, offer to convert the account to auto-replenish. If the offer is refused, retain the CC or DB information so that it can be converted at a future date to auto replenish either at a kiosk or via the web. That is the preferable approach if in-lane payments are to be used due to the speed of transaction.

b) The "club" approach is to select auto-replenish with a credit or debit card used. A one-time transaction is used to fund the account with subsequent auto-replenish. Subsequent account maintenance by can be performed over the Internet.

3. Kiosk Interface to a back office customer service center:

a) All usual routine CSC functions
a. Open Accounts
b. Make Payments
c. Maintain Accounts (change CC, DC, modify expiry etc)
d. Balance Inquiry
e. Statement Display
f. Statement Printing (may require a fee)

b) Real time credit/debit card authorization and account update required for DC and CC authorizations c) Upgrade account from one time payment to auto-replenish.

4. Interface to a Violation Processing Center

Low funds will result in a yellow light, insufficient funds a blue light (per customer requirements). Violation images are taken of all insufficient finds holders but are held. If the account is topped up to green status within 24 hours (configurable), violation images are not processed; otherwise they are. This supports the ability to do anonymous open road tolling without a display on the tag. A user gets a low balance warning and can usually top up before going negative. However, even if the user cannot do so (driving the full length of the turnpike requires more funds than they have in their account, for example), the user is given the 24 hours to top up, either over the Internet or in a kiosk, using a debit or credit card.

The above provides a very efficient form of Customer Service for Electronic Toll or payment collection Systems. Toll authorities can not only greatly reduce their current operating costs with this approach, but also expand electronic collection to the vast majority or all their customers.

This extends the considerable benefits of ETC to more users, further reduces operating and maintenance costs through reductions in toll or payment collection labor and equipment, and extends road capacity by providing a free flow toll or payment collection option for all users.

In at least one embodiment, the present invention is directed to a microprocessor-driven, motorized radio frequency (RF) tag-vending device. Designed for use in mobile payment systems such as electronic toll or payment collection (ETC), the device provides convenient self-service account establishment and inquiry, dispenses transponders (tags), and accepts account and violation payments. The ability to machine-vend tags around the clock increases customer convenience and reduces tag sales costs over typical tag store sales.

The device according to such an embodiment accepts credit cards, debit cards, and cash as payment to open or replenish an account. The standard unit has replaceable components including a magnetic stripe card reader, a cash (bills) acceptor, a receipt printer, a touch-screen display, one or more tag dispensers, internal barcode reader, a lock mechanism, internal computer, and power supply. The internal computer controls all the internal devices.

The device interfaces to existing customer service centers (CSCs) using a CSC interface protocol. The CSC computer runs administrative software that maintains the accounts and provides balance query feedback. Device status, including inventory, error reporting, machine entry and tampering alarms, is accessible remotely.

The device can be implemented in a variety of forms, such as a stand-alone kiosk, through-the-wall, or drive-up models suitable for exterior environment applications. The enclosure for each model is constructed to meet environmental requirements and customer security needs. The device is configurable to accept a variety of bank note and card formats and also may be configured to dispense a variety of tag formats, including the eGo Windshield Sticker Tag. An optional in-machine surveillance camera is available.

A bar code scanner can be added to scan violation notices received by tollway users. Settlement of the amount owed for the violation can take place at the kiosk. Another possible use for the kiosk is that a DMV can issue vehicle registration tags to verify payment of vehicle fees collected at the kiosk.

While electronic toll or payment collection devices are typically associated with turnpikes and bridges, other uses exist. For example, the Invention can also be used to collect fees and distribute transponders for parking applications and also for applications that collect access fees from commercial vehicles requiring access to airports. Electronic sticker tags are also now being issued by US Customs in part to replace the manual collection of user fees for shipments entering the US; the kiosk could also be used to distribute tags and collect these fees in an automated fashion. Similarly, pilot projects are underway to use transponders to expedite electronic payment for services at drive through facilities. The account management and transponder distribution required in these systems can also be accomplished through the use of the kiosk invention described herein. Therefore, throughout the specification and claims, the use of the term "electronic toll or payment collection device" or the like should be construed as including not only transponders for turnpikes and bridges, but also all of the above and similar uses.

Such an embodiment offers a variety of advantages, such as the following:
  Round-the-clock sale of RFID tags
  Convenient, reliable transactions
  Modular, replaceable components
  Easy servicing
  Flexible installation and configuration
  Cash (bills) or credit card
  Secure hardware and software combination
  Simple user interface
  Touchscreen display with integrated touchscreen keypad.

All of the above advantages combine to allow an open road tolling system.

Another object of the present invention is to provide a method of enrolling a user in the electronic toll or payment collection system that is interactive and user guided, thus providing convenience to the customer and eliminating the need for manpower.

Yet another object of the present invention is to provide a method of enrolling a user in the electronic toll or payment collection system that automatically dispenses a transponder for the system to the user upon enrolling the user in the system.

The foregoing objects are also attained by a method of enrolling a user in an electronic toll or payment collection system including the steps of providing a kiosk that has a programmed computer with an interactive program for enrolling a user in the electronic toll or payment collection system including a user interface, and inputting the user's information into the programmed computer through the user interface. The method also includes the step of dispensing a transponder for the electronic toll or payment collection system from the kiosk. The transponder is associated with the user based on the user's information inputted into the programmed computer.

The foregoing objects are also attained by a method of enrolling a user in an electronic toll or payment collection system, including the steps of providing a kiosk that has a programmed computer with an interactive program for enrolling a user in the electronic toll or payment collection system including a user interface, activating the interactive program and simultaneously connecting the programmed computer to the internet, and inputting the user's information into the programmed computer through the user interface. The method also includes the steps of creating a user account based on the information inputted into the programmed computer, and dispensing a transponder for the electronic toll or payment collection system from the kiosk. The transponder is associated with the user account.

Other objects, advantages and salient features of the invention will become apparent from the following detailed description, which, taken in conjunction with the annexed drawing, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

A preferred embodiment of the present invention will be set forth in detail with reference to the drawings, in which like reference numerals refer to like elements throughout.

Figure 1:
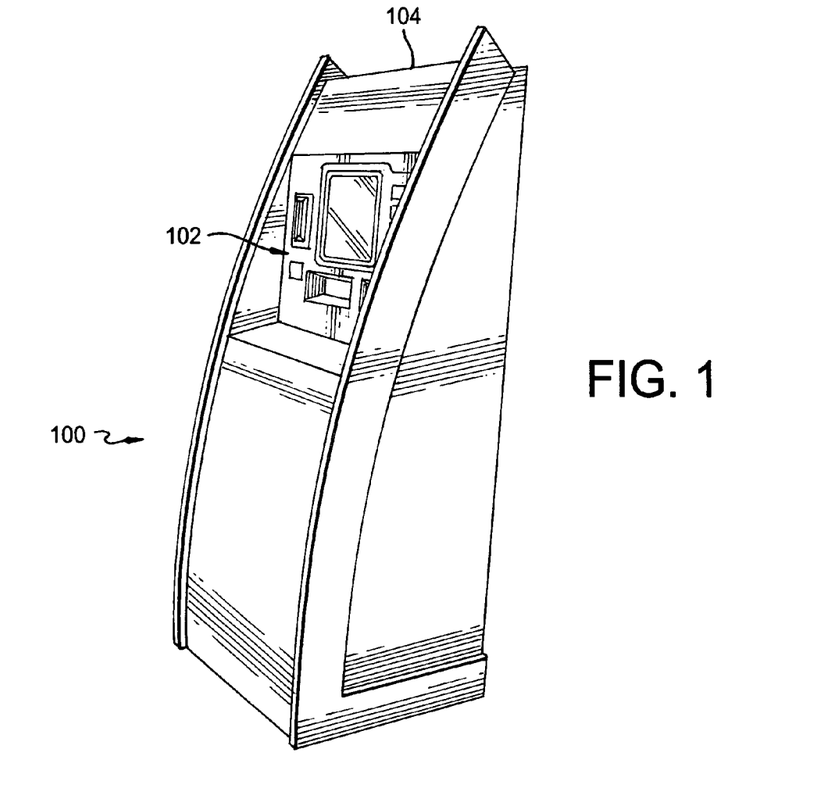
FIG. 1 shows an exterior perspective view of a kiosk of the electronic toll or payment collection system according to an embodiment of the present invention.
Figure 2:
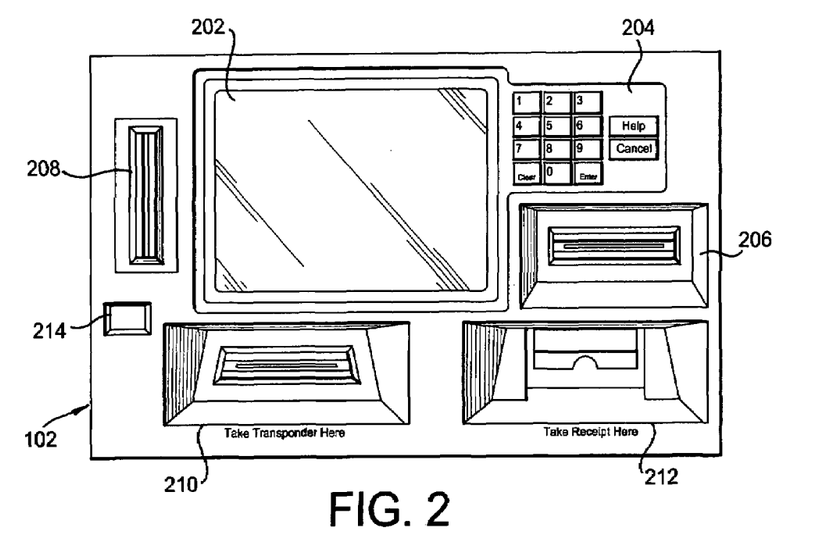
FIG. 2 shows a head-on view of a user interface panel of the kiosk of FIG. 1.

FIG. 1 shows an exterior perspective view of a kiosk 100 according to the preferred embodiment. The kiosk configuration shown in FIG. 1 is illustrative rather than limiting; as noted above, other configurations, such as through-the-wall and drive-up models, are possible within the scope of the present invention. FIG. 2 shows a head-on view of a user interface panel 102 of the kiosk 100.

The user interface 102 is based on a screen 202, which can be a 15-inch LCD display with an integrated touch-screen keypad. A separate keypad 204 can be provided instead of, or in addition to, the integrated touch-screen keypad. Of course, other screens can be used instead, such as the cathode-ray tubes common in automatic teller machines.

The user interface 102 includes one or more (preferably more) ways of accepting payment for a transponder. For example, the user can insert cash through a cash acceptor 206, which receives and validates bills. Alternatively, the user can insert a credit card or a debit card into a card reader 208, which is preferably a manual-insert reader to reduce complexity, although a motorized reader can be used instead. Both the cash acceptor 206 and the card reader 208 are known in such arts as vending machines and will therefore not be described in detail here.

Once the user inserts payment and goes through the steps (described below) to buy a transponder, the transponder is dispensed through a motorized, adjustable transponder dispenser 210. Typically, each transponder bears a bar-code label giving the transponder number, in which case the dispenser 210 includes an internal bar-code reader. One or more such dispensers can be provided, so that the kiosk can be configured to dispense a particular type of transponder or to offer the user a choice of multiple types of transponders. For example, certain models of cars have coatings on their windshields that impair the operation of internally mounted transponders; therefore, the user can be informed of that issue and offered the option of an externally mounted transponder. The user is also offered the option of receiving a receipt through a receipt printer 212, which can be an 80 mm thermal receipt printer of the type used on automatic teller machines and self-service fuel pumps.

A bar-code reader 214 reads bar codes for various purposes. For example, a violation notice can have a bar code on it; by reading the bar code from the violation notice, the kiosk 100 can associate the violation with payment inserted by the user and thus allow the user to settle the violation. Of course, other uses of the bar-code reader can be implemented.

As noted above, the kiosk 100 can be used to issue vehicle registration stickers on behalf of a DMV or other public authority. An example of a sticker issued by another public authority is the county or municipal car-tax decal required in Virginia. Another dispenser 210 can be added, or the dispenser 210 can be modified, to fulfill that function. Of course, the renewal notice for such a sticker can bear a bar code for use with the bar-code reader 214.

The kiosk 100 can include, in an appropriate location, a security camera 104, as shown in FIG. 1. The camera 104 can be implemented as in a conventional automatic teller machine.

Figure 3:
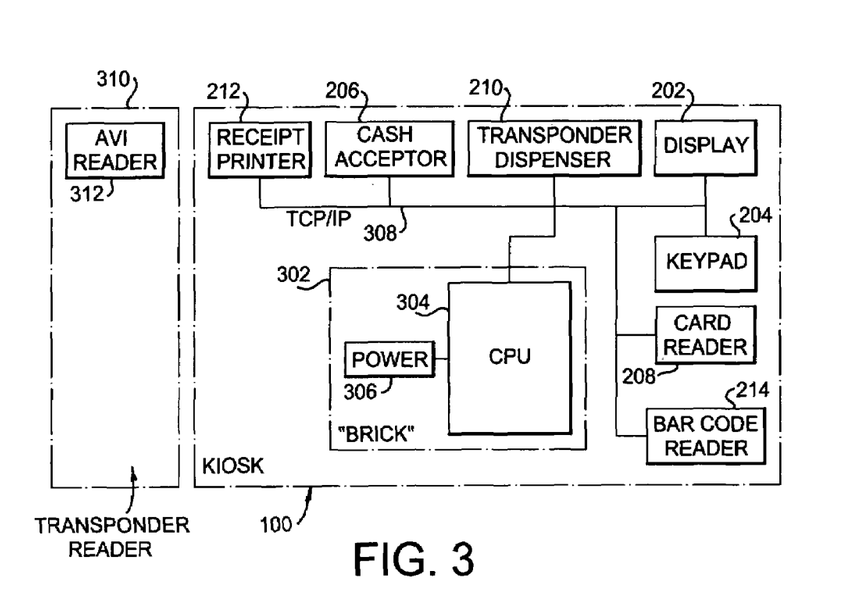
FIG. 3 shows a block diagram of the interconnection among the various components of FIG. 2.

As shown in FIG. 3, the components of the kiosk 100 disclosed above operate under the control of a computing device or "brick" 302, which includes a single-board computer 304 and a power supply 306. The "brick" is an Internet appliance and communicates over a TCP/IP connection 308 to devices external to the kiosk. For example, in a drive-through configuration, the brick 302 communicates with an external transponder reader 310 incorporating an AVI (automatic vehicle identification) reading device 312. The transponder reader 310 allows the user to add money to the transponder account, or otherwise to maintain the account, without having to enter the transponder number manually. Thus, the transponder reader 310 allows greater speed and accuracy in accessing the transponder number.

Figure 4:
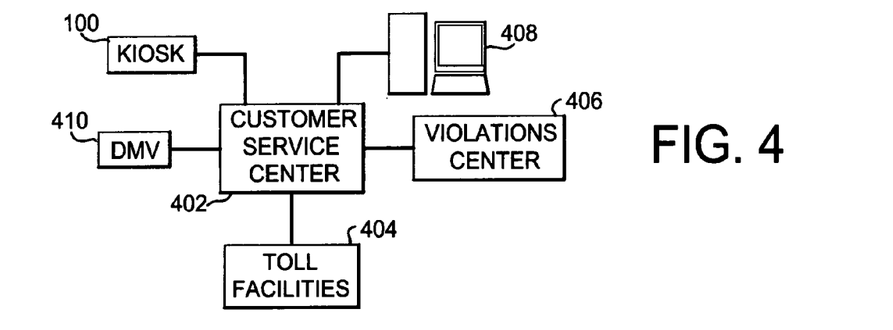
FIG. 4 shows a block diagram of the interconnection among the kiosk of FIG. 1 and various remote systems.

The brick 302 also communicates with external computer systems. For example, as shown in FIG. 4, the brick 302 allows the kiosk 100 to communicate with a customer service center 402 that performs back-office functions such as account creation and maintenance. The customer service center 402 in turn communicates with individual toll facilities 404, to allow the transponder to function at toll gates, and with a violations center 406 to handle low or depleted accounts. The user can also communicate with the customer service center to check and replenish the account by connecting over the Internet through a personal computer 408 or other Internet-enabled device. The customer service center 402 can also have a connection to a computer 410 at a DMV or other public authority to allow the kiosk 100 to handle payment of registration fees and vehicle taxes and the issuance of stickers for such fees and taxes.

The kiosk 100 operates in the following manner.

Figure 5:
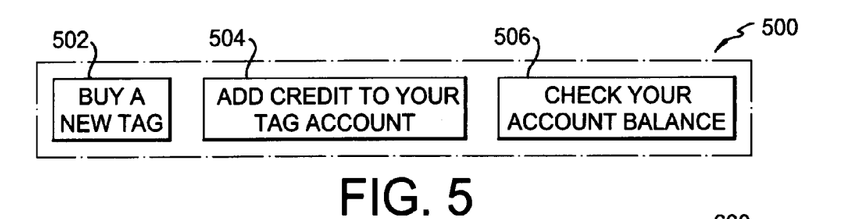
FIGS. 5-7 show screens displayed during operation of the kiosk of FIG. 1.
Figure 6:
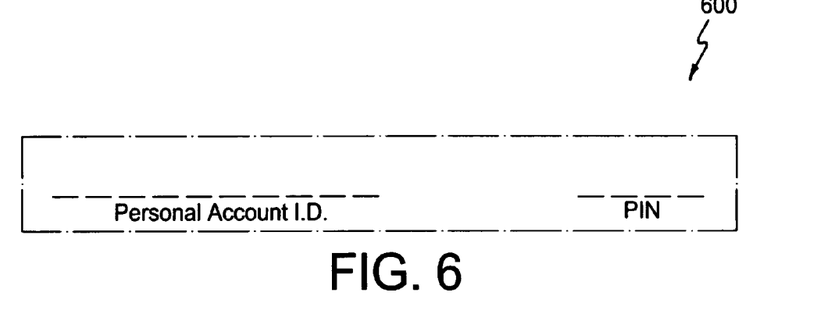

As shown in FIG. 5, the home screen 500 of the touch-screen display has the following three buttons:
"Buy a new tag" button 502
"Add credit to your tag account" button 504
"Check your account balance" button 506
If user selects the first or second button, a new screen will display two buttons:
"Pay with cash"
"Pay with credit card"
When user selects "Pay with cash" a new screen prompts:
"Insert your bills and press ENTER"
When user selects "Pay with credit card" a new screen prompts:
"Insert your credit card"
The details of the menu use are shown in the scenarios below:
CASH PURCHASE OF TAG AT THE MACHINE:
Selected from "Buy a tag"/"Pay with cash":
A new keypad screen, shown in FIG. 6 as 600, displays with a 14-digit prompt box and the prompt:
"Enter a 10-digit number (such as a phone number) and a 4-digit PIN. The number you entered will be your Personal Account ID and PIN. Press ENTER."
If user enters the "Cancel" button, go back to "Home Screen"
Prompt: "Insert your bills and press ENTER."
Amount is displayed on the screen as bills are inserted (cumulative)

When "ENTER" button is pressed, the tag is dispensed.
Bar code on tag is read as tag is dispensed.
A record from the machine to the CSC (customer service center 402 of FIG. 4) is sent with credit to apply to tag account.
A receipt is printed from the machine. Receipt should include
Receipt serial number.
Date and time
Kiosk or Location Identifier
Tag ID
Personal Account ID+Pin
"New tag purchase with cash"
Breakout into 2 transactions
Account activation fee
Amount applied to CSC account
A message asking to keep the receipt for future references.

Figure 7:
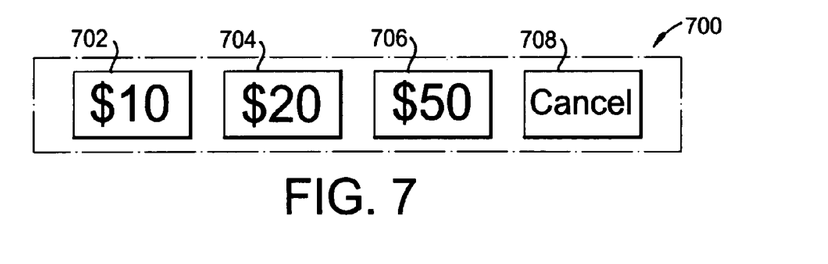

CREDIT CARD PURCHASE OF TAG AT THE MACHINE: Selected from "Buy a tag"/"Pay with credit card":
Prompt: A new keypad screen displays with a 14-digit prompt box and the prompt (see FIG. 6):
"Enter a 10-digit number (such as a phone number) and a 4-digit PIN. The number you entered will be your Personal Account ID and PIN. Press ENTER."
If user enters the "Cancel" button, go back to "Home Screen"
If the user presses the "Enter" button, a new screen displays with a prompt box and the prompt shown in FIG. 7 as 700, with the following options: $10 (button 702), $20 (button 704), $50 (button 706), and "Cancel" (button 708). Of course, other options could be provided as needed; for example, other numerical values could be offered as choices, or the user could be prompted to key in a value.
"Choose amount to be charged to credit card and press ENTER."
If user enters the "Cancel" button, go back to "Home Screen"
Prompt: "Insert your credit card". This screen has the "Cancel" button.
If user enters the "Cancel" button, go back to "Home Screen"
When a successful card read is performed, a tag is dispensed.
Bar code on tag is read as tag is dispensed.
A record from the machine to the CSC is sent with credit to apply to tag account.
A receipt is printed from the machine. Receipt should include
Receipt serial number.
Date and time
Kiosk or Location Identifier
Tag ID
a Personal Account ID+Pin
"New tag purchase with credit card"
Breakout into 2 transactions
Account activation fee
Amount applied to CSC account
A message asking to keep the receipt for future references.

CHECK ACCOUNT BALANCE: Selected from "Check account balance"
A keypad screen displays with a 14-digit prompt box and the prompt:
"Enter your 10-digit Personal Account ID and a 4-digit PIN, press ENTER" (see FIG. 6).
If user enters the "Cancel" button, go back to "Home Screen"
If valid account and pin is entered:
Tag account balance shows on screen (from CSC connection).
Receipt is printed showing
Receipt serial number.
Date and time
Kiosk or Location Identifier
Tag ID
"Balance=" Balance
Account status (active, suspended, etc.)
A message asking to keep the receipt for future references.
If invalid number, error message with "Invalid number. Press HERE to continue" and display returns to main screen.

ADD TO ACCOUNT BALANCE WITH CASH, KEYPAD INPUT: Selected from "Add credit to your tag account"/"Pay with cash"
A keypad screen displays with a 14-digit prompt box and the prompt:
"Enter your 10-digit Personal Account ID and a 4-digit PIN, press ENTER" (see FIG. 6).
If user enters the "Cancel" button, go back to "Home Screen"
Prompt: "Insert your bills and press ENTER."
Amount is displayed on the screen as bills are inserted (cumulative)
If user enters the "Cancel" button, go back to "Home Screen"
When ENTER is pressed, screen displays updated tag account balance (from CSC connection)
A printed receipt with the updated balance is printed.
Receipt serial number.
Date and time
Kiosk or Location Identifier
Tag ID
Personal Account ID+Pin
"Cash Payment=" Amount paid
Account status (active, suspended, etc.)
A message asking to keep the receipt for future references.
Verify that the tag account on CSC has been updated on CSC screen by viewing the appropriate screen.

ADD TO ACCOUNT BALANCE WITH CREDIT CARD, KEYPAD INPUT: Selected from: "Add credit to your tag account"/"Credit Card payment"
A keypad screen displays with a 14-digit prompt box and the prompt:
"Enter your 10-digit Personal Account ID and a 4-digit PIN, press ENTER" (see FIG. 6).
If user enters the "Cancel" button, go back to "Home Screen"
When "Enter" button is pressed, a new screen displays with a prompt box and the prompt shown in FIG. 7.
"Choose amount to be charged to credit card and press ENTER."
If user enters the "Cancel" button, go back to "Home Screen"
Prompt: "Insert your credit card"
When a successful card read is performed, Screen displays updated tag account balance (from CSC connection)
A printed receipt is printed with the following information:

Receipt serial number.
Date and time
Kiosk or Location Identifier
Tag ID
Personal Account ID+Pin
"Credit card Payment:" Amount paid
Account status (active, suspended, etc.)
A message asking to keep the receipt for future references.

Verify that the tag account on CSC has been updated on CSC screen viewing the appropriate screen.

Tables I, II, and III below show proposed part lists for a stand-alone kiosk, a wall-mounted unit, and an in-lane vending unit, respectively. The part lists are illustrative rather than limiting; those skilled in the art who have reviewed the present disclosure will be able to select other parts appropriate to any given situation.

TABLE I

Part List for Stand-Alone Kiosk

| ITEM | QTY FOR EACH MACHINE | MFR PART NUMBER | DESCRIPTION | SUPPLIER |
|---|---|---|---|---|
| Dispenser Mechanism | 2 | CTD-200 | Dispenser mechanism | Vendapin |
| Vending Controller Card | 1 | CECB4 | | Vendapin |
| Barcode scanner | 1 | FIS-0003-0002 | Microscan MS-3 Bar Code Scanner, High Density, Raster type | Microscan |
| Scanner Interface Box | 1 | 99-420001-01 | IB-105 Interface box, RS232/422/485 | Microscan |
| Scanner Power Supply | 1 | 97-100002-01 | Power Supply, 90-264 VAC, +5VDC, USA Plug (use with IB-105) | Microscan |
| Scanner Mounting Bracket | 1 | 98-000060-01 | Side Mounting Bracket | Microscan |
| 17" Touchscreen Monitor | 1 | | | |
| Single board PC (brick) w/OS | 1 | | Advantech 5820 w/HD, RS-232, RAM, chassis, OS | |
| Receipt printer | 1 | | 80 mm receipt printer with cutter | |
| Bill acceptor/Vault | 1 | | Best grade | |
| Credit card acceptor (insert model) | 1 | | | |
| UPS | 1 | | | |
| Keyboard (for config/test) | 1 | | | |
| Mouse (for config/test) | 1 | | | |
| UPS | 1 | | | |
| Outlet strip | 1 | | Isobar quad outlet | |
| Metal cabinet | 1 | | Heavy steel cabinet for security | |
| Video surveillance | 1 | | In TagTeller, camera, video capture, video transmission system | |
| Alarm system | 1 | | Alarm board | |

TABLE II

Part List for Wall-Mounted Unit

| ITEM | QTY FOR EACH MACHINE | MFR PART NUMBER | DESCRIPTION | SUPPLIER |
|---|---|---|---|---|
| Dispenser Mechanism | 2 | CTD-200 | Dispenser mechanism | Vendapin |
| Vending Controller Card | 1 | CECB4 | Card that co | Vendapin |
| Barcode scanner | 1 | FIS-0003-0002 | Microscan MS-3 Bar Code Scanner, High Density, Raster type | Microscan |
| Scanner Interface Box | 1 | 99-420001-01 | IB-105 Interface box, RS232/422/485 | Microscan |
| Scanner Power Supply | 1 | 97-100002-01 | Power Supply, 90-264 VAC, +5VDC, USA Plug (use with IB-105) | Microscan |
| Scanner Mounting Bracket | 1 | 98-000060-01 | Side Mounting Bracket | Microscan |
| 17" Touchscreen Monitor | 1 | | | |
| Single board PC (brick) w/OS | 1 | | Advantech 5820 w/HD, RS-232, RAM, chassis, OS | |

TABLE II-continued

Part List for Wall-Mounted Unit

| ITEM | QTY FOR EACH MACHINE | MFR PART NUMBER | DESCRIPTION | SUPPLIER |
|---|---|---|---|---|
| Receipt printer | 1 | | 80 mm receipt printer with cutter | |
| Bill acceptor/Vault | 1 | | Best grade | |
| Credit card acceptor (insert model) | 1 | | | |
| Keyboard (for config/test) | 1 | | | |
| Mouse (for config/test) | 1 | | | |
| Metal cabinet | 1 | | Heavy steel cabinet for security | |
| 2210 RF Reader | 1 | | | |
| UTA Antenna | 1 | 12-3152-002 | UTA w/ cktag | |
| RF feedline | 15 | | | |
| RF connectors | 2 | | | |
| Interface cable | 20 | | Reader to TagTeller interface cable | |
| Transformer | 1 | | For 2210 reader | |
| Loop detector/materials | 1 | | Single channel loop detector, harness, materials | |
| Antenna mounting pole & hw | | | | |
| Enclosure heater | 1 | | 800 watt heater | Hoffman |
| Enclosure Air Conditioner | 1 | | | Hoffman |
| Video surveillance | 1 | | In TagTeller, camera, video capture, video transmission system | |
| Alarm system | 1 | | Alarm board | |
| UPS | 1 | | | |
| Outlet strip | 1 | | Isobar quad outlet | |

TABLE III

Part List for In-Lane Unit

| ITEM | QTY FOR EACH MACHINE | MFR PART NUMBER | DESCRIPTION | SUPPLIER |
|---|---|---|---|---|
| Dispenser Mechanism | 2 | CTD-200 | Dispenser mechanism | Vendapin |
| Vending Controller Card | 1 | CECB4 | | Vendapin |
| Barcode scanner | 1 | FIS-0003-0002 | Microscan MS-3 Bar Code Scanner, High Density, Raster type | Microscan |
| Scanner Interface Box | 1 | 99-420001-01 | IB-105 Interface box, RS232/422/485 | Microscan |
| Scanner Power Supply | 1 | 97-100002-01 | Power Supply, 90-264 VAC, +5VDC, USA Plug (use with IB-105) | Microscan |
| Scanner Mounting Bracket | 1 | 98-000060-01 | Side Mounting Bracket | Microscan |
| 17" Touchscreen Monitor | 1 | | | |
| Single board PC (brick) w/OS | 1 | | Advantech 5820 w/HD, RS-232, RAM, chassis, OS | |
| Receipt printer | 1 | | 80 mm receipt printer with cutter | |
| Bill acceptor/Vault | 1 | | Best grade | |
| Credit card acceptor (insert model) | 1 | | | |
| UPS | 1 | | | |
| Keyboard (for config/test) | 1 | | | |
| Mouse (for config/test) | 1 | | | |
| UPS | 1 | | | |
| Outlet strip | 1 | | Isobar quad outlet | |
| Metal cabinet | 1 | | Steel cabinet- lighter duty than for stand-alone system | |

TABLE III-continued

Part List for In-Lane Unit

| ITEM | QTY FOR EACH MACHINE | MFR PART NUMBER | DESCRIPTION | SUPPLIER |
|---|---|---|---|---|
| Video surveillance | 1 | | In TagTeller, camera, video capture, video transmission system | |
| Alarm system | 1 | | Alarm board | |

As noted above, the kiosk 100 can be used to implement an open road tolling system. A way of doing so will be explained with reference to FIG. 8. As shown in that figure, a section of roadway 800 includes special lanes 802 between toll gantry points 804. The special lanes 802 have kiosks 100 on them.

Figure 8:
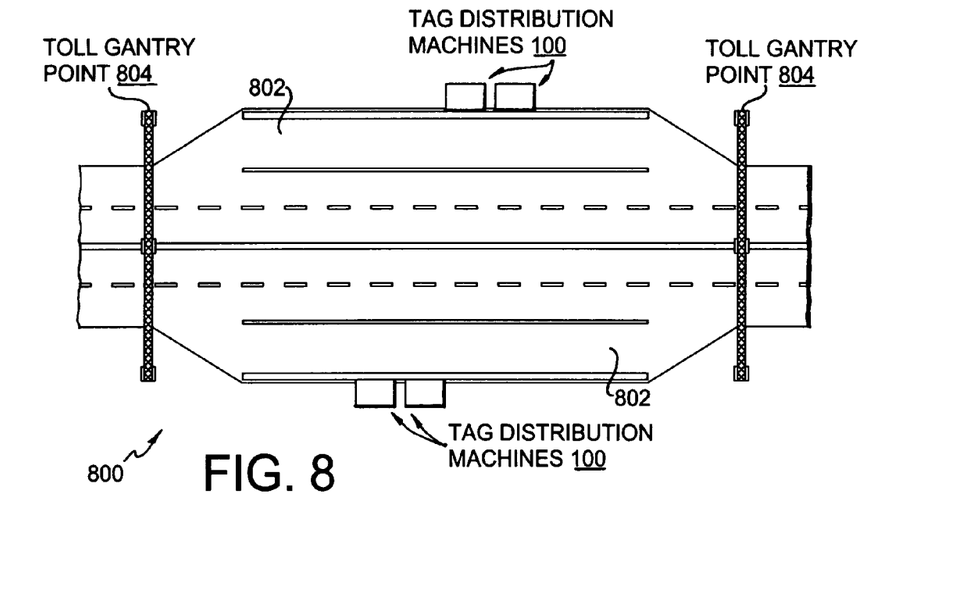
FIG. 8 shows a section of roadway on which kiosks of FIG. 1 are provided.

By putting the kiosks 100 in the lanes 802, users can very efficiently and quickly be set up to use the electronic tag system. This avoids the need to rely on "pay by plate" or individual transaction cash collection to accommodate occasional and transitional users. The enhanced efficiency and convenience of the process also permits more rapid market penetration for the tags in general, making all electronic tolling that much easier and cheaper. One possible approach to convert to an all electronic toll road without reliance on video billing is the following.

Drivers pull up into a lane 802. The lane 802 is equipped with an automated kiosk 100 with a bill collector/credit card reader and e-sticker issuing machine. As the driver approaches access to the facility, and if the vehicle does not have a valid transponder or sticker, the driver is directed by an electronic sign to a drive-through machine, where the driver has a choice to buy a pre-paid sticker, with a one time user fee of $3.50. The user inserts a bill and gets the balance credited in tolls. For example, if the user puts in $5.00, the user gets $1.50 in pre-paid toll. If they put in a $20.00 bill they get $16.50 in prepaid tolls. If they use a credit card, they can pay amount they choose (with the same user fee), but have the option to make the sticker "replenishable," thus avoiding a new user fee the next time they use the system. Users also have a choice of using the internet or a 1-800 number using IVR to "top-up" their account. If users want to pay cash again, they get a new sticker and pay a new user fee The sticker then acts as a pre-paid tag for the remainder of the trip. Alternatively, an authority might decide to permit in-lane account "top up" by interfacing the tag reader to the kiosk, as described above with reference to FIG. 3. Payments made at the kiosk would automatically be associated with the account related to the tag in the lane.

Figure 9:
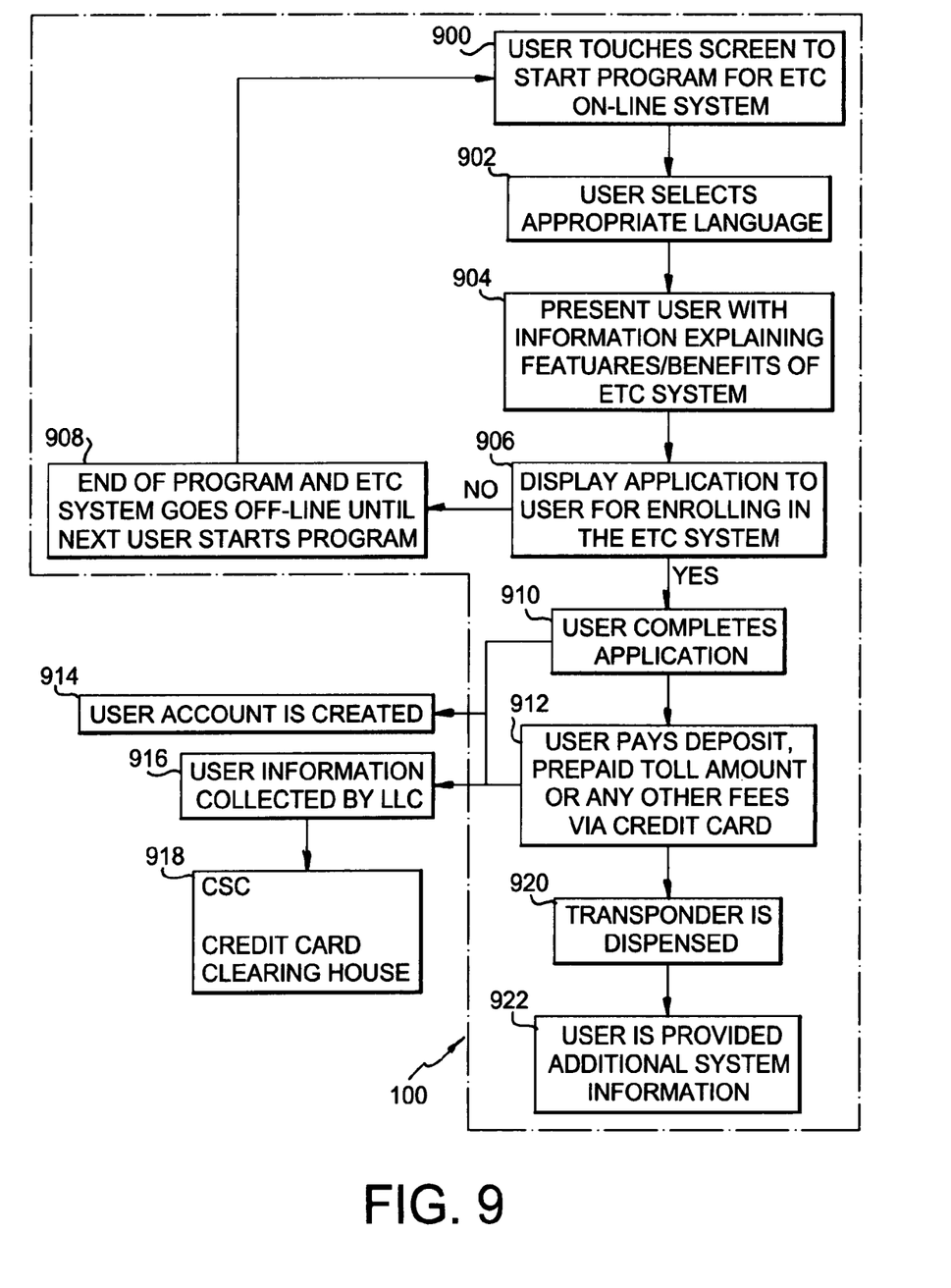
FIG. 9 is a flow chart of the method of enrolling a user in the electronic toll or payment collection system according to the present invention.

Referring to FIG. 9, the method of enrolling a user in an electronic toll or payment collection (ETC) system according to the present invention provides a convenient mechanism for a user to participate in the system. In general, a kiosk, such as kiosk 100, having a programmed computer, such as computer 304 (FIG. 3), can be placed in any convenient location, such as a shopping mall, that provides a customer or user with information regarding the electronic toll or payment collection system and with the opportunity to enroll in the system through an interactive program, and dispenses an electronic transponder for the system to the user upon validation of the user's payment information. The user interface, such as interface 102 (FIG. 1), can be any of a touch screen interface, a voice response interface, a keyboard, a mouse, and the like. The method provides an interactive self-guided system for enrolling a user in the electronic toll or payment collection system and the immediate distribution of a transponder without the need of an assistant or employee of the toll company.

More specifically, a user approaches the kiosk 100 and starts the program through the user interface by touching a screen of the kiosk 100 or by voice activation at step 900. Alternatively, a motion detector can be use with the kiosk 100 that detects the presence of a user and automatically starts the program. Substantially simultaneously with the starting of the program, the programmed computer 304 of the kiosk connects to the internet. That allows transfer and retrieval of information regarding the electronic toll or payment collection system, the user, and the user's enrollment therein.

At the next step 902, the program prompts the user through the user interface 102 to select an appropriate language from a listing of any number of languages. For example, the screen 202 of the kiosk 100 can list several languages and the user either touches or clicks on the appropriate language, types in the appropriate language, or speaks the desired language. Once the user has selected a language, the program provides the user with information regarding the electronic toll or payment collection system through the user interface at step 904. For example, the features and benefits of the system can be displayed on the screen through a series of menus, or provided by an audio or video of the information. A softcopy of the information can be e-mailed to the user or a hardcopy of the information can be provided at the kiosk using a printer, such as receipt printer 212 (FIG. 2), of the kiosk 100.

After learning about the system, the user is presented with the opportunity through the user interface 102 to enroll in the system at step 906. For example, the program can prompt the user about participating in the system. An application can then be displayed in a format that the user can readily fill in the required information by either touching or clicking on appropriate selections, typing in the information, or speaking the information. If the user decides not to enroll in the system, the program will end and go off-line at step 908 until the next user starts the program. If the user decides to enroll in the system, the user provides the appropriate information via the application at step 910. With the completion of the application, the user then submits payment by any known method, such as by credit card, debit card, cash, smart card, internet transaction, cash or other payment mechanism, through the user interface 102 at step 912. The payment covers enrollment or deposit fees, prepaid toll or payment amounts, or other applicable fees.

Based on the completed application, a user account is created at step 914. Information regarding the user account can then be transferred via the internet or an intranet to a local control computer (LLC) of the system at step 916 that can be interfaced with the systems customer service center (CSC) 402 (FIG. 4) and a credit card clearing house at step 918. Upon validation of the user's payment information, a transponder associated with the user and the user's account is immediately dispensed through the kiosk at step 920, in a manner similar to a conventional vending machine. The user's account is activated shortly thereafter allowing the user to use the transponder for the toll company's roadway facilities.

The user can then obtain further information regarding the electronic toll or payment collection system through the user interface 102 at step 922. For example, the user can obtain information regarding route planning, maps, toll rate schedules, construction schedules, points of interest, lodging and restaurants, or fuel locations. Similar to step 904, the information can be provided in any medium including a screen display, a softcopy, a hardcopy, audio, or video, sv wireless broadcast, email, etc.

While preferred embodiments have been set forth in detail above, those skilled in the art who have reviewed the present disclosure will readily appreciate that other embodiments can be realized within the scope of the invention. For example, disclosures of numerical values are illustrative rather than limiting, as are disclosures of certain types of transponders and of the screen prompts. Also, the connections shown in FIGS. 3 and 4 can be any suitable type of connection. Furthermore, the user interface 102 can be modified in any suitable way; examples are such features of existing automatic teller machines as audible prompts and buttons on both sides of the display 202 for selecting options on the display. Moreover, as explained above, while the invention is contemplated for use with road tolls, it has application to any transponders or other electronic devices used for payment for service; accordingly, the term "electronic toll or payment collection device" in the specification and claims should be given a meaning broad enough to cover all such transponders and other devices. Therefore, the present invention should be construed as limited only by the appended claims.

What is claimed is:

1. A method of enrolling in an electronic toll or payment collection system, comprising the steps of:
providing a kiosk having a programmed computer with an interactive program for enrolling a user in the electronic toll or payment collection system including a user interface;
inputting the user's information into the programmed computer through the user interface, the user's information comprising information which is independent of both a method of payment for a transponder for the electronic toll or payment collection system and a number identifying the transponder for the electronic toll or payment collection system; and
dispensing the transponder for the electronic toll or payment collection system from the kiosk, the transponder being associated with the user based on the user's information inputted into the programmed computer.

2. A method according to claim 1, further comprising the step of
providing information to the user through the user interface.

3. A method according to claim 2, wherein
the information being provided includes any one of the benefits of the electronic toll or payment collection system, route mapping, fare schedules, point of interest, weather, user account, and lodging and restaurant locations.

4. A method according to claim 2, wherein
the information is displayed through a series of menus that the user can select.

5. A method according to claim 1, further comprising step of
selecting a language through the user interface appropriate for the user.

6. A method according to claim 1, wherein
the user interface includes any one of a touch screen, a keyboard, a mouse, and voice response.

7. A method according to claim 1, further comprising the step of
creating a user account based on the information inputted by the user through the user interface.

8. A method according to claim 1, further comprising the step of
connecting the kiosk to the internet.

9. A method according to claim 1, further comprising the step of
transferring the inputted user information to a control computer.

10. A method according to claim 9, further comprising the step of
interfacing the control computer with a customer service center of the electronic toll or payment collection system.

11. A method according to claim 1, further comprising the step of
making a fee payment prior to the step of dispensing a transponder.

12. A method according to claim 1, wherein said step of inputting user information includes completing an application provided to the user.

13. A method according to claim 1, wherein the user's information comprises a telephone number.

14. A method according to claim 1, wherein the user's information comprises a personal identification number.

15. A method according to claim 1, wherein the user's information further comprises information identifying a payment medium, and wherein a value on the transponder is automatically replenished from the payment medium.

16. A method according to claim 1, wherein the kiosk permits payment of vehicle fees to a government agency.

17. A method of enrolling in an electronic toll or payment collection system, comprising the steps of:
providing a kiosk having a programmed computer with an interactive program for enrolling a user in the electronic toll or payment collection system including a user interface;
activating the interactive program and simultaneously connecting the programmed computer to the internet;
inputting the user's information into the programmed computer through the user interface, the user's information comprising information which is independent of both a method of payment for a transponder for the electronic toll or payment collection system and a number identifying the transponder for the electronic toll or payment collection system;
creating a user account based on the information inputted into the programmed computer; and
dispensing the transponder for the electronic toll or payment collection system from the kiosk, the transponder being associated with the user account.

18. A method according to claim 17, further comprising the step of providing information to the user through the user interface.

19. A method according to claim 18, wherein
the information being provided includes any one of the benefits of the electronic toll or payment collection system, route mapping, fare schedules, point of interest, weather, user account, and lodging and restaurant locations.

20. A method according to claim 17, wherein
the user interface includes any one of a touch screen, a keyboard, and voice activation.

21. A method according to claim 17, further comprising the step of selecting a language through the user interface appropriate for the user.

22. A method according to claim 17, wherein the user's information comprises a telephone number.

23. A method according to claim 17, wherein the user's information comprises a personal identification number.

24. A method according to claim 17, wherein the user's information further comprises information identifying a payment medium, and wherein a value on the transponder is automatically replenished from the payment medium.

25. A method according to claim 17, wherein the kiosk permits payment of vehicle fees to a government agency.

* * * * *